US00RE49818E

(19) United States
(12) Reissued Patent
Kurashige

(10) Patent Number: US RE49,818 E
(45) Date of Reissued Patent: *Jan. 30, 2024

(54) INFORMATION PROCESSING METHOD IN A MULTI-LEVEL HIERARCHICAL MEMORY SYSTEM

(71) Applicant: Kioxia Corporation, Tokyo (JP)

(72) Inventor: Takehiko Kurashige, Ome (JP)

(73) Assignee: Kioxia Corporation, Tokyo (JP)

( * ) Notice: This patent is subject to a terminal disclaimer.

(21) Appl. No.: 16/939,224

(22) Filed: Jul. 27, 2020

Related U.S. Patent Documents

Reissue of:
(64) Patent No.: 8,639,881
Issued: Jan. 28, 2014
Appl. No.: 13/079,621
Filed: Apr. 4, 2011

U.S. Applications:
(63) Continuation-in-part of application No. 15/009,093, filed on Jan. 28, 2016, now Pat. No. Re. 48,127,
(Continued)

(30) Foreign Application Priority Data

May 13, 2010 (JP) ..... 2010-111280

(51) Int. Cl.
*G06F 12/00* (2006.01)
*G06F 13/28* (2006.01)
*G06F 12/0866* (2016.01)

(52) U.S. Cl.
CPC ..... *G06F 12/0866* (2013.01); *Y02D 10/00* (2018.01)

(58) Field of Classification Search
CPC ..... G06F 2/0866; G06F 12/0811; G06F 12/0866; G06F 12/0868; G06F 12/0871; G06F 12/0873; Y02D 10/00; Y02D 10/13
See application file for complete search history.

(56) References Cited

U.S. PATENT DOCUMENTS 4,429,363 A * 1/1984 Duke ..... G06F 12/0866 711/143
4,466,059 A * 8/1984 Bastian ..... G06F 12/0804 711/E12.04

(Continued)

FOREIGN PATENT DOCUMENTS

EP 0-475-639 A2 8/1991
JP 63-247853 10/1988

(Continued)

OTHER PUBLICATIONS

Japanese Patent Application No. 2010-111280, First Office Action, dated Jul. 5, 2011, (with English Translation).

(Continued)

*Primary Examiner* — B. James Peikari
(74) *Attorney, Agent, or Firm* — Finnegan, Henderson, Farabow, Garrett & Dunner, LLP

(57) ABSTRACT

According to one embodiment, an information processing apparatus includes a memory includes a buffer area, a first storage, a second storage and a driver. The buffer area is reserved in order to transfer data between the driver and a host system that requests for data writing and data reading. The driver is configured to write data into the second storage and read data from the second storage in units of predetermined blocks using the first storage as a cache for the second storage. The driver is further configured to reserve a cache area in the memory, between the buffer area and the first external storage, and between the buffer area and the second storage. The driver is further configured to manage the cache area in units of the predetermined blocks.

18 Claims, 6 Drawing Sheets

(Amended)

Related U.S. Application Data which is an application for the reissue of Pat. No. 8,639,881.

(56) References Cited

U.S. PATENT DOCUMENTS

| | | | | |
|---|---|---|---|---|
| 4,500,954 | A * | 2/1985 | Duke | G06F 12/0866 711/138 |
| 4,638,425 | A * | 1/1987 | Hartung | G06F 12/0866 714/10 |
| 4,885,680 | A * | 12/1989 | Anthony | G06F 12/1045 711/120 |
| 4,972,316 | A | 11/1990 | Dixon et al. | |
| 5,420,998 | A * | 5/1995 | Horning | G06F 12/0866 711/E12.019 |
| 5,546,348 | A | 8/1996 | Honma et al. | |
| 5,636,359 | A * | 6/1997 | Beardsley | G06F 12/0866 711/E12.019 |
| 5,860,083 | A | 1/1999 | Sukegawa | |
| 6,360,297 | B1 * | 3/2002 | Arimilli | G06F 12/0897 711/E12.043 |
| 6,567,889 | B1 * | 5/2003 | DeKoning et al. | 711/114 |
| 7,076,605 | B1 | 7/2006 | Son | |
| 7,512,734 | B2 * | 3/2009 | Sutardja | G06F 1/3221 711/112 |
| 2003/0014741 | A1 * | 1/2003 | Megiddo | G06F 8/4441 717/158 |
| 2003/0065898 | A1 * | 4/2003 | Flamma et al. | 711/165 |
| 2003/0200388 | A1 * | 10/2003 | Hetrick | 711/114 |
| 2004/0078508 | A1 * | 4/2004 | Rivard | G06F 12/0866 711/E12.019 |
| 2005/0172067 | A1 * | 8/2005 | Sinclair | 711/103 |
| 2005/0195635 | A1 | 9/2005 | Conley et al. | |
| 2006/0101202 | A1 | 5/2006 | Mannen et al. | |
| 2007/0033362 | A1 | 2/2007 | Sinclair | |
| 2007/0088915 | A1 * | 4/2007 | Archambault | G06F 9/3879 711/137 |
| 2007/0094445 | A1 * | 4/2007 | Trika | G06F 3/0616 711/E12.019 |
| 2008/0046660 | A1 | 2/2008 | Takai et al. | |
| 2008/0172518 | A1 * | 7/2008 | Shmulevich et al. | 711/103 |
| 2008/0184255 | A1 | 7/2008 | Watanabe et al. | |
| 2008/0195801 | A1 * | 8/2008 | Cheon | G06F 12/0866 711/E12.019 |
| 2008/0209112 | A1 * | 8/2008 | Yu | G06F 12/0246 711/E12.001 |
| 2008/0288714 | A1 * | 11/2008 | Salomon | G06F 8/61 711/E12.008 |
| 2009/0089492 | A1 * | 4/2009 | Yoon | G06F 3/0628 711/E12.001 |
| 2009/0103203 | A1 * | 4/2009 | Yoshida | G11B 5/09 360/110 |
| 2009/0182835 | A1 * | 7/2009 | Aviles | H04L 67/1097 709/213 |
| 2009/0193182 | A1 * | 7/2009 | Nitta | G06F 12/0804 710/52 |
| 2009/0210730 | A1 * | 8/2009 | Bonanno | G06F 9/3848 713/320 |
| 2009/0222616 | A1 * | 9/2009 | Yano | G06F 12/0246 711/135 |
| 2009/0327837 | A1 * | 12/2009 | Royer | G06F 12/0866 714/763 |
| 2010/0088459 | A1 * | 4/2010 | Arya | G06F 12/122 711/E12.008 |
| 2010/0100664 | A1 | 4/2010 | Shimozono | |
| 2011/0145489 | A1 * | 6/2011 | Yu et al. | 711/103 |
| 2011/0179219 | A1 * | 7/2011 | Ma et al. | 711/103 |

FOREIGN PATENT DOCUMENTS

| | | | |
|---|---|---|---|
| JP | 63-247853 | A | 10/1988 |
| JP | 4-111113 | | 4/1992 |
| JP | 4-111113 | A | 4/1992 |
| JP | 5-019981 | | 1/1993 |
| JP | 5-019981 | A | 1/1993 |
| JP | 6-139027 | | 5/1994 |
| JP | 6-139027 | A | 5/1994 |
| JP | 07-006093 | | 1/1995 |
| JP | 07-006093 | A | 1/1995 |
| JP | 7-225652 | | 8/1995 |
| JP | 7-225652 | A | 8/1995 |
| JP | 07-230411 | | 8/1995 |
| JP | 07-230411 | A | 8/1995 |
| JP | 07-253929 | | 10/1995 |
| JP | 07-253929 | A | 10/1995 |
| JP | 9-147497 | | 6/1997 |
| JP | 9-147497 | A | 6/1997 |
| JP | 2006-139478 | | 6/2006 |
| JP | 2006-139478 | A | 6/2006 |
| JP | 2007-528079 | | 10/2007 |
| JP | 2007-528079 | A | 10/2007 |
| JP | 2008-046964 | | 2/2008 |
| JP | 2008-046964 | A | 2/2008 |
| JP | 2008-181382 | | 8/2008 |
| JP | 2008-181382 | A | 8/2008 |
| JP | 2009-503731 | | 1/2009 |
| JP | 2009-163647 | | 7/2009 |
| JP | 2009-163647 | A | 7/2009 |
| JP | 2010-102369 | | 5/2010 |
| JP | 2010-102369 | A | 5/2010 |
| WO | 2007019076 | A3 | 2/2007 |
| WO | WO 2007019076 | A2 | 2/2007 |

OTHER PUBLICATIONS

Japanese Patent Application No. 2010-111280, Final Office Action, dated Jan. 10, 2012, (with English Translation).

* cited by examiner

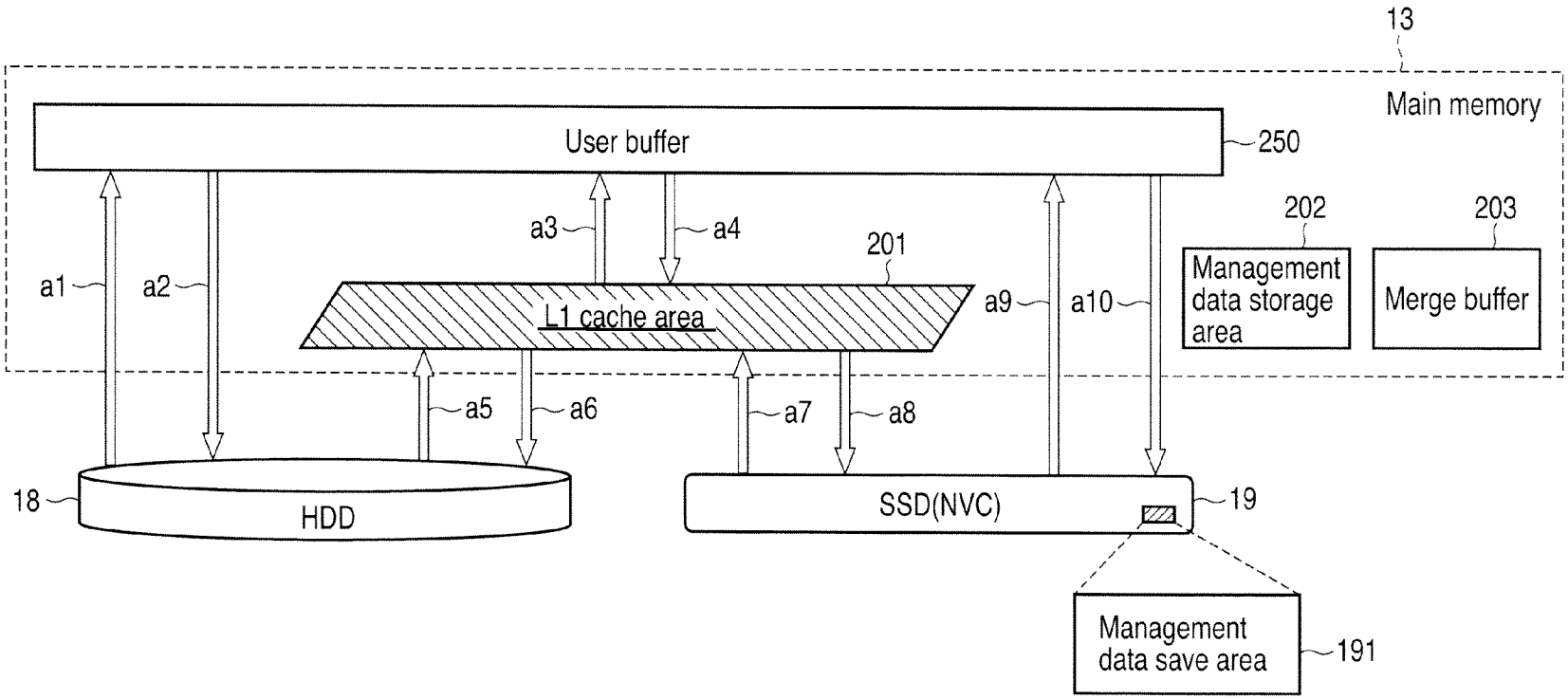
FIG. 2
(Amended)

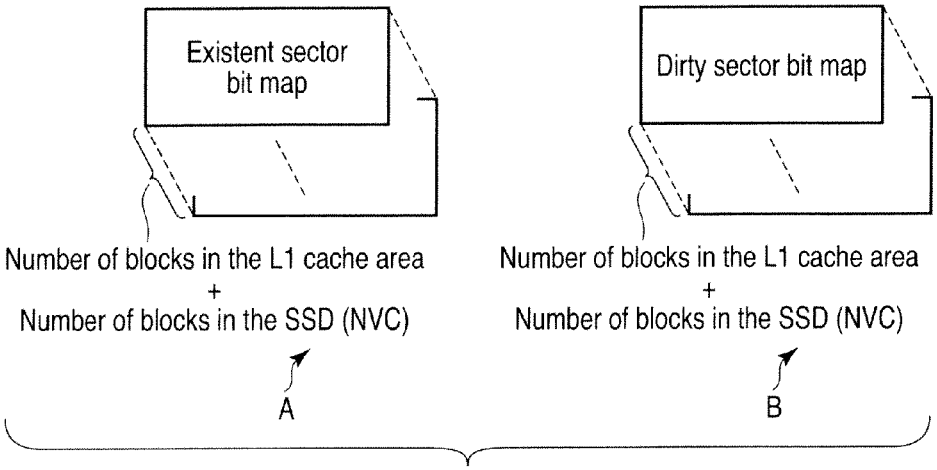
F I G. 3
(Amended)

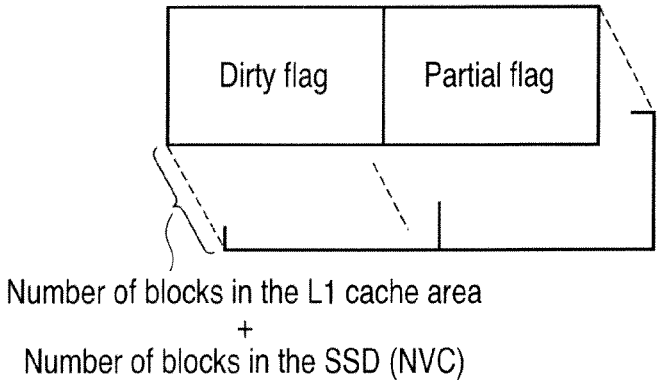
FIG. 5
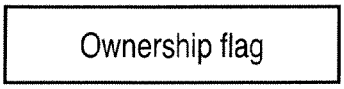
FIG. 6
| Write trace area |
| --- |
| Write commands issued by BIOS (in units of blocks) |
| Write commands issued by BIOS (in units of blocks) |
| Write commands issued by BIOS (in units of blocks) |
| ⋮ |
FIG. 7
| | |
| --- | --- |
| SSD individual data | Number of times SSD powered on |
| HDD individual data | Number of times HDD powered on |
FIG. 8

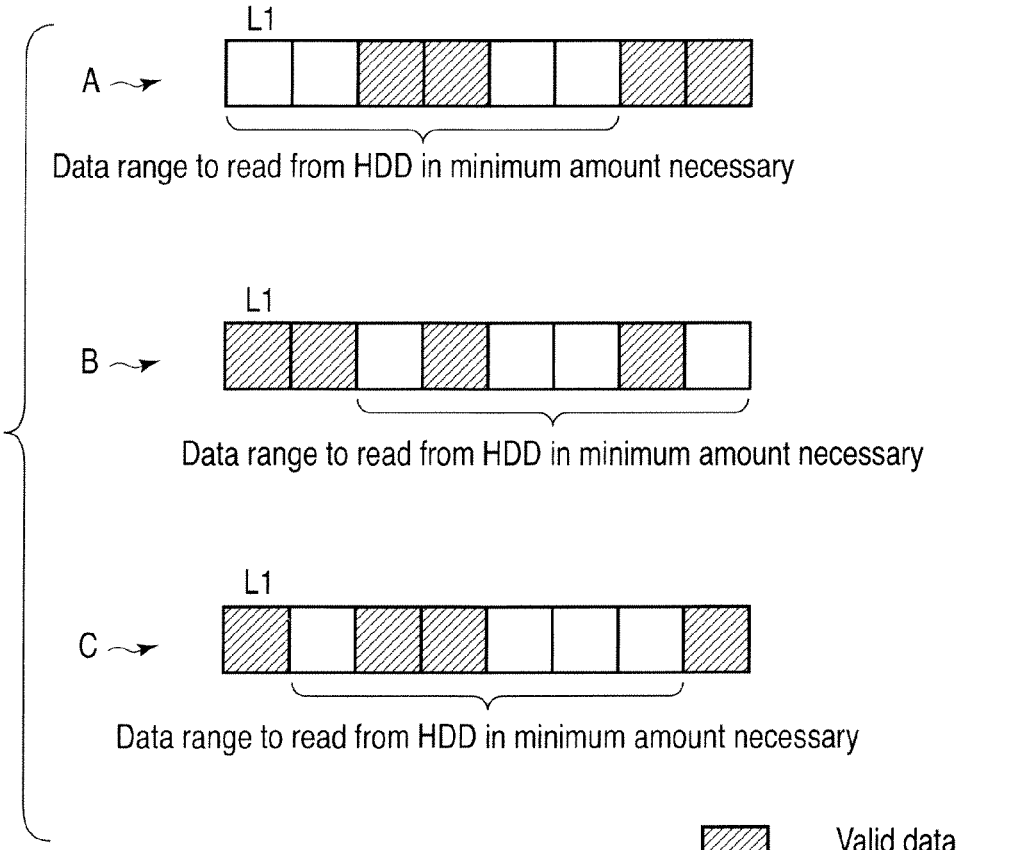
F I G. 10
(Amended)

INFORMATION PROCESSING METHOD IN A MULTI-LEVEL HIERARCHICAL MEMORY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS-REFERENCE TO RELATED APPLICATIONS]

*CROSS REFERENCE TO RELATED APPLICATIONS*

[This application is based upon and claims the benefit of priority from prior Japanese Patent Application No. 2010-111280, filed May 13, 2010; the entire contents of which are incorporated herein by reference.]

*This application is a continuation reissue application of U.S. application Ser. No. 15/009,093, filed Jan. 28, 2016 (now Reissue U.S. Pat. No. RE48,127). Both this application and U.S. application Ser. No. 15/009,093 are reissues of U.S. Pat. No. 8,639,881 B2, issued on Jan. 28, 2014, from U.S. application Ser. No. 13/079,621, filed Apr. 4, 2011, which is based upon and claims the benefit of priority from prior Japanese Patent Application No. 2010-111280, filed May 13, 2010. The entire contents of the above-identified applications are incorporated herein by reference in their entirety.*

FIELD

Embodiments described herein relate generally to an information processing apparatus such as a personal computer that incorporates, for example, a solid sate drive (SSD) and a hard disk drive (HDD), using the SSD as a cache for the HDD thereby to increase the speed of accessing to the HDD, and also to a driver that operates in the information processing apparatus.

BACKGROUND

In today's information society, great amounts of data are used. HDDs are widely used as data storage media. This is because each HDD has a large storage capacity and is relatively inexpensive. Although the HDD can hold much data and is relatively inexpensive, it has a relatively low access speed.

In comparison with the HDD, the flash memory has indeed a high access speed. It is, however, expensive. If SSDs each having a flash memory are used in place of all HDDs in a file server that has several HDDs, the manufacturing cost of the file server will greatly increase.

In view of this, various high-speed data storage systems have been proposed, in which a plurality of data storage media of different characteristics are combined to attain a large storage capacity and achieve a high access speed.

In a data storage system including a first data storage medium that is expensive and operates at high speed, and a second data storage medium that is inexpensive and operates at low speed, the first data storage medium may be used as a cache for the second data medium. Then, an access to the second data storage media can be apparently faster.

In a data storage system having this configuration, the first data storage medium and the second storage medium are accessed independently in most cases. Some measures must therefore be taken to increase the speed and efficiency of the data transfer between the first and second data storage media.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary conceptual diagram illustrating the operating principle of the HDD/SSD driver (cache driver) incorporated in the information processing apparatus according to the embodiment.

FIG. 3 is an exemplary first diagram showing an exemplary existent sector bit map and dirty sector bit map reserved in the information processing apparatus according to the embodiment.

FIG. 5 is an exemplary diagram showing an exemplary Dirty flag and Partial flag provided in the information processing apparatus according to the embodiment.

FIG. 6 is an exemplary diagram showing an exemplary ownership flag provided in the information processing apparatus according to the embodiment.

FIG. 7 is an exemplary diagram showing an exemplary write trace area reserved in the information processing apparatus according to the embodiment.

FIG. 8 is an exemplary diagram showing an exemplary area reserved in the information processing apparatus, to record the ID data about the SSD and HDD and the number of times the power switch has been closed.

FIG. 10 is an exemplary conceptual diagram explaining how the information processing apparatus according to the embodiment reads a minimum amount of data that should be processed to achieve data merging.

DETAILED DESCRIPTION

Various embodiments will be described hereinafter with reference to the accompanying drawings.

In general, according to one embodiment, an information processing apparatus includes a memory comprising a buffer area, a first storage, a second storage and a driver. The buffer area is reserved in order to transfer data between the driver and a host system that requests for data writing and data reading. The driver is configured to write data into the second storage and read data from the second storage in units of predetermined blocks using the first storage as a cache for the second storage. The driver is further configured to reserve a cache area in the memory, between the buffer area and the first external storage, and between the buffer area and the second storage. The driver is further configured to manage the cache area in units of the predetermined blocks.

Figure 1:
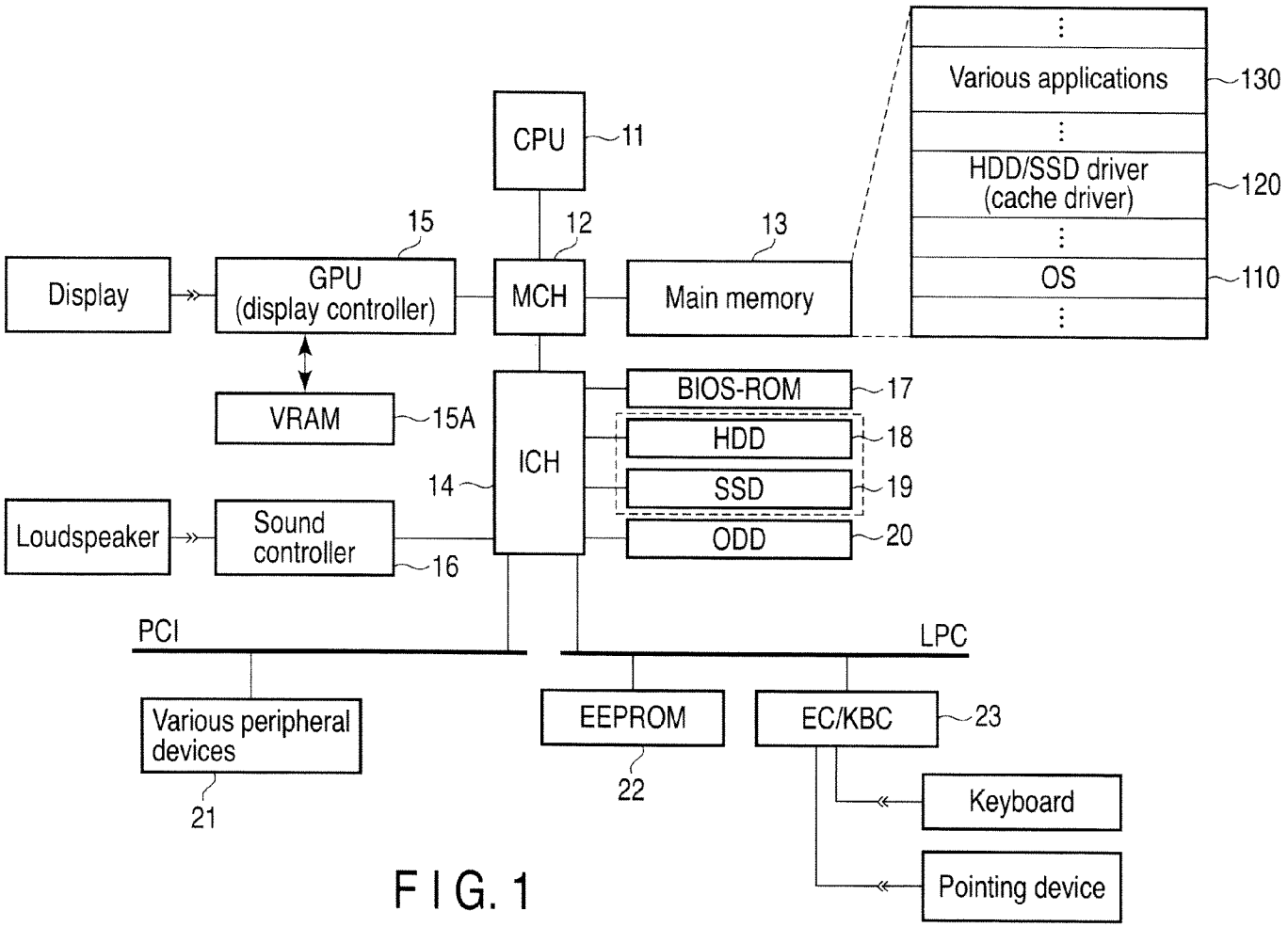
FIG. 1 is an exemplary diagram showing a system configuration of an information processing apparatus according to an embodiment.

FIG. 1 is an exemplary diagram showing a system configuration of an information processing apparatus according to an embodiment. The information processing apparatus is implemented as a personal computer.

As shown in FIG. 1, the information processing apparatus includes a central processing unit (CPU) 11, a memory controller hub (MCH) 12, a main memory 13, an I/O control hub (ICH) 14, a graphics processing unit (GPU, or display controller) 15, a video memory (VRAM) 15A, a sound controller 16, a basic input/output system-read only memory (BIOS-ROM) 17, an HDD 18, an SSD 19, an optical disc drive (ODD) 20, various peripheral devices 21, an electrically erasable programmable ROM (EEPROM) 22, and an embedded controller/keyboard controller (EC/KBC) 23.

The CPU 11 is a processor that controls the other components of the information processing apparatus, and executes the various programs loaded into the main memory 13 from the HDD 18 or ODD 20. The programs the CPU 11 may execute include OS 110 that manages resources, an HDD/SSD driver (cache driver) 120 and various application programs 130 that operate under the control of the OS 110. The HDD/SSD driver 120 is a program that controls the HDD 18 and the SSD 19. In the information processing apparatus, the SSD 19 is used, either in part or in entirety, as a cache for the HDD 18, thereby to access the HDD 18 faster than otherwise. The HDD/SSD driver 120 is configured to make the SSD 19 function as a cache. The operating principle of the HDD/SSD driver 120 will be described below, in detail.

If a part of the SSD 19 is used as a cache for the HDD 18, the other part of the SSD 19 is allocated as a data area that the various application programs 130, for example, can use, merely issuing commands to the SSD 19. If the entire SSD 19 is used as a cache for the HDD 18, the existence of the SSD 19 is concealed to the various application programs 130, etc.

The CPU 11 also executes a BIOS stored in the BIOS-ROM 17. The BIOS is a hardware control program. Hereinafter, the BIOS stored in the BIOS-ROM 17 will be described as BIOS 17 in some cases.

The MCH 12 operates as a bridge that connects the CPU 11 and the ICH 14, and also as a memory controller that controls the access to the main memory 13. The MCH 12 includes the function of performing communication with the GPU 15.

The GPU 15 operates as a display controller to control the display incorporated in or connected to the information processing apparatus. The GPU 15 includes the VRAM 15A and incorporates an accelerator that generates, in place of the CPU 11, the images that the various programs may display.

The ICH 14 incorporates an integrated device electronics (IDE) controller that controls the HDD 19, SSD 19 and ODD 20. The ICH 14 also controls the various peripheral devices 21 connected to a peripheral component interconnection (PCI) bus. Further, the ICH 14 includes the function of performing communication with the sound controller 16.

The sound controller 16 is a sound source device that outputs audio data items the various programs may play back, to a speaker or the like which is either incorporated in or connected to the information processing apparatus.

The EEPROM 22 is a memory device configured to store, for example, ID data of the information processing apparatus and environment-setting data. The EC/KBC 23 is a one-chip micro processing unit (MPU) in which an embedded controller and a keyboard controller are integrated. The embedded controller manages power. The keyboard controller controls data input at a keyboard and a pointing device.

FIG. 2 is an exemplary conceptual diagram illustrating the operating principle of the HDD/SSD driver that operates in the information processing apparatus configured as described above.

A user buffer 250 is an area reserved in the main memory 13 by the OS 110, which the application programs 130 uses to write data in the HDD 18 or read data from the HDD 18. The HDD/SSD driver 120 performs a process of writing data in the HDD 18 so that the data may be written in the user buffer 250, or a process of storing, in the user buffer 250, the data read from the HDD 18. That is, the user buffer 250 is a storage area reserved in the main memory 13 in order to achieve data transfer between a higher system (host system) and the HDD/SSD driver 120.

As described above, the information processing apparatus uses the SSD 19 as a cache for the HDD 18, thereby accessing the HDD 18 faster than otherwise. Thus, the HDD/SSD driver 120, which controls the HDD 18 and the SSD 19, reserves an L1 cache area 201 in the main memory 13, between the user buffer 250, on the one hand, and the HDD 18 and SSD 19, on the other. In this embodiment, the SSD 19 is used as a storage medium that functions as a cache for the HOD 18. Nonetheless, a data storage medium can of course be used instead, as a nonvolatile cache (NVC).

The HDD/SSD driver 120 manages the L1 cache area 201 in the main memory 13, in units of blocks each having a size of, for example, 64 [bytes] *kilobytes*. The HDD/SSD driver 120 receives a write request or a read request from the host system, the former requesting data writing into the HDD 18, and the latter requesting data reading from the HDD 18. The HDD/SSD driver 120 divides the write request into write-request segments associated with data blocks, respectively, and the read request into read-request segments associated with data blocks, respectively. The HDD/SSD driver 120 issues the write-request segments or read-request segments, as needed, to the HDD 18 or the SSD 19. In order to manage the data in the L1 cache area 201 and the data in the SSD 19 (used as cache for the HDD 18), the HDD/SSD driver 120 reserves a management data storage area 202 in the main memory 13.

(Process of Reading Data)

How the HDD/SSD driver 120 reads data in response to a read request coming from the host system will be explained first.

If all read data is stored in the L1 cache area 201, the HDD/SSD driver 120 stores the data in the L1 cache area 210 into the user buffer 250 (a3 in FIG. 2). The HDD/SSD driver 120 then notifies the host system that the data reading process has been completed.

If a part of the read data exists in the L1 cache area 201, the

HDD/SSD driver 120 reads the other part of the data, which does not exist in the L1 cache area 201, from the HDD 18 into the L1 cache area 201 (a5 in FIG. 2), and stores, in the user buffer 250, the data request by the host system (a3 in FIG. 2). At this point, the HDD/SSD driver 120 notifies the host system that the data reading process has been completed. Thereafter, the HDD/SSD driver 120 reserves a space in the SSD 19 and accumulates the request data in this space (a8 in FIG. 2). At the time the data is stored in the user buffer 250, or before the data is accumulated in the SSD 19, the HDD/SSD driver 120 notifies the host system that the data reading process has been completed. The host system can therefore go to the next process. Note that the HDD/SSD driver 120 reserves a space in the SSD 19, by using an unused area or an area which does not hold data to be written to the HDD 18 and which remains not accessed longer than any other area. Whenever necessary, the HDD/SSD driver 120 reserves a space in the SSD 19 in the same way.

If the read data does not exist in the L1 cache area 201, but exists in the SSD 19, the HDD/SSD driver 120 reads the data stored in the SSD 19 and stores the data into the user buffer 250 (a9 in FIG. 2). Then, the HDD/SSD driver 120 notifies the host system that the data reading process has been completed.

If the read data does not exist in the L1 cache area 201 and if a part of the data exists in the SSD 19, the HDD/SSD driver 120 reserves a space in the L1 cache area 201. Then, the HDD/SSD driver 120 reads a part of the data from the SSD 19 and the data from the HDD 18 and stores them in the space thus reserved in the L1 cache area 201 (a5 and a7 in FIG. 2). To reserve a space in the L1 cache area 201, the HDD/SSD driver 120 uses an unused area or an area which does not hold data to be written to the HDD18 and not accumulated in the SSD 19 and which remains not accessed longer than any other area. Whenever necessary, the HDD/SSD driver 120 reserve a space in the L1 cache area 201 in the same way. The HDD/SSD driver 120 stores the data read, i.e., requested data read into the space reserved in the L1 cache area 201, into the user buffer 250 (a3 in FIG. 2). Then, the HDD/SSD driver 120 notifies the host system that the data reading process has been completed. Thereafter, the HDD/SSD driver 120 reserves a space in the SSD 19 and accumulates the data in the space reserved in the SSD 19 (a8 in FIG. 2).

If the read data exists neither in the L1 cache area 201 nor the SSD 19, the HDD/SSD driver 120 reserves a space in the L1 cache area 201 and reads the data stored in the HDD 18 into the space reserved in the L1 cache area 201 (a5 in FIG. 2). The HDD/SSD driver 120 stores the data read into the space reserved in the L1 cache area 201, i.e., data requested, into the user buffer 250 (a3 in FIG. 2). Then, the HDD/SSD driver 120 notifies the host system that the data reading process has been completed. Thereafter, the HDD/SSD driver 120 reserves a space in the SSD 19 and accumulates the data in the space reserved in the SSD 19 (a8 in FIG. 2).

(Process of Writing Data)

How the HDD/SSD driver 120 writes data in response to a write request coming from the host system will now be explained.

If the data to update exits in the L1 cache area 201 only, not in the SSD 19 at all, the HDD/SSD driver 120 rewrites the data stored in the L1 cache area 201 (a4 in FIG. 2) and notifies the host system that the data writing process has been completed. Thereafter, the HDD/SSD driver 120 reserves a space in the SSD 19 and accumulates the rewritten data in the space reserved in the SSD 19 (a8 in FIG. 2).

If the data to update exits in both the L1 cache area 201 and the SSD 19, the HDD/SSD driver 120 invalidates the data in the SSD 19 and rewrites the data stored in the L1 cache area 201 (a4 in FIG. 2). Then, the HDD/SSD driver 120 notifies the host system that the data writing process has been completed. Thereafter, the HDD/SSD driver 120 reserves a space in the SSD 19 and accumulates the rewritten data in the space reserved in the SSD 19 (a8 in FIG. 2).

If the data to update exits in the SSD 19 only, not in the L1 cache area 201, the HDD/SSD driver 120 rewrites the data stored in the SSD 19 (a10 in FIG. 2). Then, the HDD/SSD driver 120 notifies the host system that the data writing process has been completed.

If the data to update exits in neither the SSD 19 nor the L1 cache area 201, the HDD/SSD driver 120 reserves a space in the L1 cache area 201 and stores the write data, in the space reserved in the L1 cache area 201 (a4 in FIG. 2). Then, the HDD/SSD driver 120 notifies the host system that the data writing process has been completed. Thereafter, the HDD/SSD driver 120 reserves a space in the SSD 19 and accumulates the data stored in the L1 cache area 201, in the space reserved in the SS 19 (a9 in FIG. 2).

(Process of Flushing Data)

The HDD/SSD driver 120 performs a process of flushing data, transferring, to the HDD 18, data that has not ever been written in the HDD 18. That is, the HDD/SSD driver 120 writes the data stored in the L1 cache area 201 into the HDD 18 (a6 in FIG. 2). The data stored in the SSD 19 is written into the HDD 18, after it has been stored in the L1 cache area 201 (a7 and a6 in FIG. 2).

In the information processing apparatus, the SSD 19 is thus used as a cache for the HDD 18. The HDD/SSD driver 120, which controls the HDD 18 and the SSD 19, reserves an L1 cache area 201 in the main memory 13, between the user buffer 250, on the one hand, and the HDD 18 and SSD 19, on the other. Moreover, the HDD/SSD driver 120 manages the L1 cache area 201 in units of blocks, whereby data is transferred between the HDD 18 and the SSD 19 at high speed and high efficiency (a3 to a8 in FIG. 2).

The host system may issue a write force-unit access (FUA) request for a process of writing data in the write-through mode. In this case, the HDD/SSD driver 120 not only performs the ordinary data writing process, but also issues a write FUA request to the HDD 18, upon receiving the write FUA request. Then, the HDD/SSD driver 120 notifies the host system of the completion of the data writing process after it has received a notification of the data writing process from the HDD 18.

As described above in conjunction with "(Process of Reading Data)," the HDD/SSD driver 120 reads the data stored in the SSD 19 and stores the data into the user buffer 250 if the data to read does not exist in the L1 cache area 201, but exists in the SSD 19 (a9 in FIG. 2). This data reading process may be performed via the L1 cache area 201. That is, the HDD/SSD driver 120 may first reserve a space in the L1 cache area 201, may then read the data stored in the SSD 19 and store the same into the space, and may finally store this data into the user buffer 250 (a7 and a3 in FIG. 2). In this case, the data can be read again, as needed, from the L1 cache area 201 that achieves higher performance than the SSD 19.

Assume that the data to read does not exist in the L1 cache area 201, but exists in the SSD 19. Then, to read the data stored in the SSD 19 and store the same into the user buffer 250, a parameter indicating whether the data should be read via the L1 cache area 201 or not may be supplied to the HDD/SSD driver 120. If this is the case, only one driver, i.e., HDD/SSD driver 120, can cope with both a system in which data should not better be read via the L1 cache area 201 (a9 in FIG. 2) and a system in which data should better be read via the L1 cache area 201 (a7 and a3 in FIG. 2).

As described above in conjunction with "(Process of Writing Data)," the HDD/SSD driver 120 notifies the host system of the completion of the data writing process when the data is accumulated in the L1 cache area 201 or the SSD 19. This operating mode shall hereinafter be referred to as "write-back (WB) mode." The information processing apparatus can operate not only in the WB mode, but also in the write-through (WT) mode. In the WT mode, the HDD/SSD driver 120 may accumulate data in the L1 cache area 201 or the SSD 19 and wire the data into the HDD 18, and may then notify the host system of the completion of the data writing process. Further, a parameter indicating whether the data should be written in the WB mode or the WT mode may be supplied to the HDD/SSD driver 120. How the HDD/SSD driver 120 operates in the WI mode in response to a write request coming from the host system in will be explained below.

The data to update may exist in the L1 cache area 201 only, that is, the data may exist in the L1 cache area 201 but not in the SSD 19. In this case, the HDD/SSD driver 120 rewrites the data in both the L1 cache area 201 and the HDD 18 (a4 and a2 in FIG. 2). When the data is written in both the L1 cache area 201 and the HDD 18, the HDD/SSD driver 120 notifies the host system of the completion of the data writing process. When the data is completely rewritten in the HDD 18, the HDD/SSD driver 120 reserves a space in the SSD 19, and accumulates the data stored in the L1 cache area 201, in the space reserved in the SSD 19 (a8 in FIG. 2).

The data to update may exist in both the L1 cache area 201 and the L1 cache area 201. In this case, the HDD/SSD driver 120 rewrites the data in both the L1 cache area 201 and the L1 cache area 201 (a4, a10 and a2 in FIG. 2). When the data is so rewritten, the HDD/SSD driver 120 notifies the host system of the completion of the data writing process. As the data is rewritten in the SSD 19, first, HDD/SSD driver 120 may invalidate the data stored in the SSD 19. After the data has been rewritten in the L1 cache area 201 (a4 in FIG. 2), HDD/SSD driver 120 may reserve a space in the SSD 19 and may then accumulate the rewritten data in the space reserved in the SSD 19 (a8 in FIG. 2).

The data to update may exist in the SSD 19 only, that is, it may exist in the SSD 19 but not in the L1 cache area 201. If this is the case, the HDD/SSD driver 120 rewrites data in both the SSD 19 and the HDD 18 (a10 and a2 in FIG. 2). When the data is rewritten in both the SSD 19 and the HDD 18, the HDD/SSD driver 120 notifies the host system of the completion of data rewriting process.

The data to update may exist in neither the L1 cache area 201 nor the SSD 19. In this case, the HDD/SSD driver 120 rewrites data in the HDD 18 (a2 in FIG. 2). After the data is so rewritten, the HDD/SSD driver 120 notifies the host system of the completion of the data rewriting process. The data rewriting process performed if the data to rewrite exists in neither the L1 cache area 201 nor the SSD 19 includes writing new data (i.e., replacing invalid data with valid data).

The HDD/SSD driver 120 thus operates in the WB mode or the WT mode in accordance with the parameter. One driver, i.e., HDD/SSD driver 120, can therefore cope with both a system in which data should better be write in the WB more and a system in which data should better be write in the WT mode.

Further, in the WT mode, the HDD/SSD driver 120 may not rewrite the data to update, if stored in the SSD 19, but may instead invalidate the data stored in the SSD 19. This operating mode shall be called "WI mode." If the WI mode is selected in accordance with the parameter, the HDD/SSD driver 120 can operate more efficiently if the SSD 19 has a lower data-rewriting performance than the HDD 18.

(Process of Managing Data)

As described above, the HDD/SSD driver 120 manages the L1 cache area 201 reserved in the main memory 13, in units of blocks, and writes and reads data into and from the HDD 18 in units of blocks. How the HDD/SSD driver 120 manages data will be now explained.

In the WB mode, a write request coming from the host system does not always request that data be written in units of blocks. If one block is composed of 128 sectors, it must be determined which sectors hold valid data and which sectors hold the data (Dirty) to be written to the HDD 18. To this end, the HDD/SSD driver 120 provides an existent-sector bit map ("A" of FIG. 3) and a dirty-sector bit map ("B" of FIG. 3), each for the blocks of the L1 cache area 201 in the main memory 13 and the SSD 19 (part of the SSD 19 used as a cache for the HDD 18). The existent-sector bit map and the dirty-sector bit map are provided as management data managed in the management data storage area 202.

Figure 4:
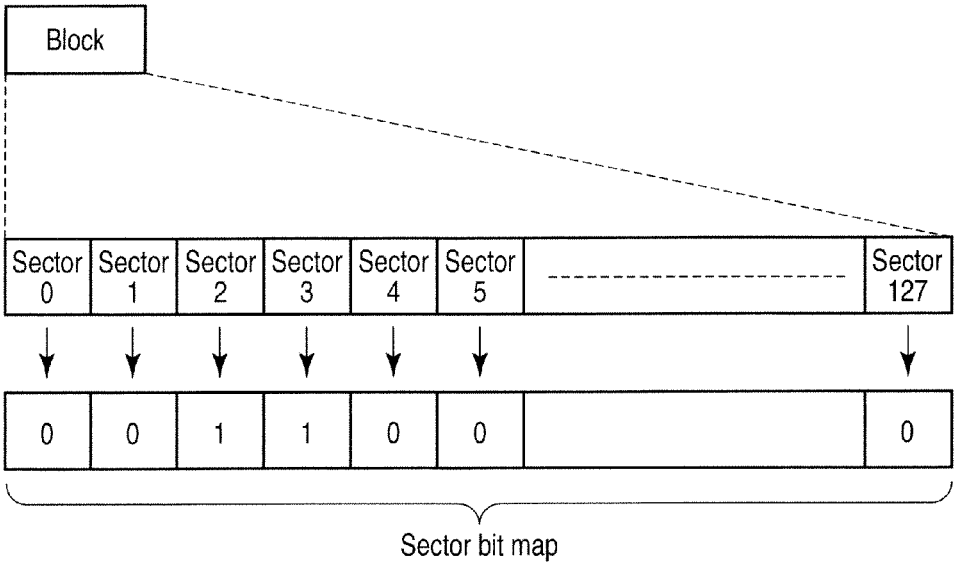
FIG. 4 is an exemplary second diagram showing an exemplary existent sector bit map and dirty sector bit map provided in the information processing apparatus according to the embodiment.

The existent-sector bit map is management data representing which sector in the associated block is valid. The dirty-sector bit map is management data representing which sector in the associated block is dirty. These two sector bit maps hold bits, as shown in FIG. 4, each representing the state of each sector in the block. Hence, if one block is composed of 128 sectors, either sector bit map holds 128 bits, or 16 bytes, for each block.

These two bit maps are managed. The HDD/SSD driver 120 can therefore use the L1 cache area 201 reserved in the main memory 13 and the SSD 19, thereby appropriately writing or reading data into and from the HDD 18.

As described above, the dirty-sector bit map is provided to determine which sector is dirty in each block. Therefore, a large storage capacity is required, which is (number of blocks in the L1 cache area 201+the number of blocks in the SSD 19)×16 bytes. In view of this, the HDD/SSD driver 120 may not provide the dirty-sector bit map, and may provide a Dirty flag and a Partial flag (both shown in FIG. 5) for each block in the L1 cache area 201 of the main memory 13 and for each block in the SSD 19 used as cache for the HDD 18. The Dirty flag indicates whether the data (Dirty) to be written to the HDD 18 exists in the block. The Partial flag indicates whether the data (Dirty) existing in the block is partial or not. These flags are provided as management data managed in the management data storage area 202 reserved in the main memory 13.

The dirty flag is true if the data (Dirty) to be written to the HDD 18 exists in the block, and is false if the data (Dirty) to be written to the HDD 18 does not exist in the block. The Partial flag is true if all sectors exist in the block, and is false if only some sectors exist in the block. Since all sectors exist in the block if the Partial flag is false, the existent-sector bit map need not be referred to, in some cases.

(Nonvolatile Operation)

The HDD/SSD driver 120 performs a nonvolatile operation so that the data accumulated in the SSD 19 may be used even after the information processing apparatus has been activated again. The nonvolatile operation is based on the assumption that the host system includes a function of transmitting a shutdown notice to the HDD/SSD driver 120. Even after transmitting the shutdown notice to the HDD/SSD driver 120, the host system may indeed issue a write request or a read request, but to the HDD/SSD driver 120 only. To perform the nonvolatile operation on these conditions, the HDD/SSD driver 120 reserves a management data save area 191 reserved in the SSD 19, for storing the management data controlled in the management data storage area 202 reserved in the main memory 13.

After receiving the shutdown notice, the HDD/SSD driver 120 operates in the WT mode even if the WB mode is set, and starts a flush operation. At the time the flush operation is completed, the HDD/SSD driver 120 guarantees that the write data remains neither in the L1 cache area 201 of the main memory 13 nor in the SSD 19.

When the flush operation is completed, the HDD/SSD driver 120 stores the management data held in the management data storage area 202 reserved in the main memory 13, into the management data save area 191 reserved in the SSD 19. At this point, the HDD/SSD driver 120 needs to write an existent-sector bit map, but no dirty data exists. Therefore, the HDD/SSD driver 120 need not write a dirty-sector bit map or a Dirty flag/a Partial flag.

After writing the management data from the management data storage area 202 reserved in the main memory 13 into the management data save area 191 reserved in the SSD 19, the HDD/SSD driver 120 operates, not changing the management data and not causing data contradiction between the HDD 18 and the SSD 19. That is, the HDD/SSD driver 120 rewrites data in both the HDD 18 and the SSD 19 when it receives a write request from the host system and the SSD 19 holds the data to update, and does not perform the accumulation (learning) of the read data in the SSD 19 in response to a read request.

After the information processing apparatus is activated again, the HDD/SSD driver 120 loads the management data stored in the management data save area 191 reserved in the SSD 19, into the management data storage area 202 reserved in the main memory 13, without initializing the management data. (This is because the main memory 13, which has the L1 cache area 201, is volatile.) The HDD/SSD driver 120 initializes only the management data about the L1 cache area 201. By performing the nonvolatile operation described above, the HDD/SSD driver 120 makes it possible to use the data accumulated in the SSD 19, even after the information processing apparatus has been activated again, and can guarantee that the write data remains neither in the L1 cache area 201 of the main memory 13 nor in the SSD 19. In most systems, another module (capable of accessing the HDD 18), such as the BIOS 17, operates before the HDD/SSD driver 120 operates. If there remains data not written into the HDD 18, the module (e.g., BIOS 17) must have a function of controlling the cache (i.e., the SSD 19 and the L1 cache area 201 of the main memory 13). In the information processing apparatus, however, the BIOS 17 or the like need not have the function of controlling the cache. This is because the HDD/SSD driver 120 performs the nonvolatile operation, guaranteeing that the write data remains neither in the L1 cache area 201 of the main memory 13 nor in the SSD 19.

(Guarantee of Data in Nonvolatile Operation)

The HDD/SSD driver 120 includes a function, which will be described. This function is for determining whether the data accumulated in the SSD 19 is consistent with the data stored in the HDD 19. If the HDD/SSD driver 120 determines that the data accumulated in the SSD 19 is not consistent with the data stored in the HDD 19, it will perform a volatile operation to destroy the data accumulated in the SSD 19.

To perform this function, the HDD/SSD driver 120 provides an Ownership flag (shown in FIG. 6) in the management data save area 191 reserved in the SSD 19. The Ownership flag has a value "Driver" or the other value "None." The value "Driver" indicates that the HDD/SSD driver 120 is operating. The value "None" indicates that the HDD/SSD driver 120 is not operating.

When the HDD/SSD driver 120 is loaded, the HDD/SSD driver 120 checks the Ownership flag. If the Ownership flag has the value "None," the HDD/SSD driver 120 determines that the data accumulated in the SSD 19 can be guaranteed as consistent with the data stored in the HDD 19, and then loads the management data stored in the management data save area 191, from the SSD 19 to the L1 cache area 201 of the main memory 13. If the Ownership flag does not have the value "None," the HDD/SSD driver 120 determines that the data accumulated in the SSD 19 cannot be guaranteed as consistent with the data stored in the HDD 19, and then initializes the management data and makes the SSD 19 volatile (invalid).

The rule of updating the Ownership flag will be explained. The HDD/SSD driver 120 rewrites the Ownership flag to the value "Driver" before it starts a cache operation. In order to save the management data after the completion of the cache operation in the nonvolatile operation, the HDD/SSD driver 120 rewrites the Ownership flag to the value "None."

The data cannot be guaranteed as consistent with the data stored in the HDD 19 if the power-supply interruption, a clash or a hang-up occurs while the data information apparatus is operating. Nonetheless, the reliability of the data can be raised because the HDD/SSD driver 120 uses the data accumulated in the SSD 19 only if the data consistency can be guaranteed by using the Ownership flag as described above.

As described above, the HDD/SSD driver 120 alone guarantees the data in the nonvolatile operation. Nevertheless, another module (i.e., BIOS 17, here) capable of accessing the HDD 18 before the HDD/SSD driver 120 starts operating may have a minimal cache controlling function to perform the nonvolatile operation as described below, even if the module has written data into the HDD 18.

In this case, the Ownership flag can have a third value "BIOS," which indicates that the BIOS 17 is operating. Hence, the value "None" indicates that neither the BIOS 17 nor the HDD/SSD driver 120 is operating. Note that a write trace area is reserved in the management data save area 191.

When activated, the BIOS 17 examines the Ownership flag. If the Ownership flag has the value "None," the BIOS 17 determines that the data consistency can be guaranteed and then rewrites the Ownership flag to the value "BIOS." If the Ownership flag has not the value "None," the BIOS 17 determines that the data consistency cannot be guaranteed. In this case, the BIOS 17 leaves the Ownership flag not rewritten.

If the BIOS 17 finds that the data consistency can be guaranteed, it therefore changes the Ownership flag to the value "BIOS." In this case, the BIOS 17 accumulates write commands for writing data into the HDD 18, in units of blocks as shown in FIG. 7, in the write trace area reserved in the management data save area 191, when it writes data into the HDD 18. Since the write command is written in units of blocks, no request length is required. That is, the logical block addresses (LBAs) of the respective data blocks are used, thereby reducing the amount of trace data. If the write trace area overflows, the BIOS 17 first stops accumulating the write commands, and then rewrites the Ownership flag to the value "None."

On the other hand, the HDD/SSD driver 120 examines the Ownership flag, when it is loaded. If the Ownership flag has the value "BIOS," the HDD/SSD driver 120 finds that the data consistency can be guaranteed. The HDD/SSD driver 120 then loads the management data from the management data save area 191 reserved in the SSD 19 into the management data storage area 202 reserved in the main memory 13. Further, the HDD/SSD driver 120 refers to the write trace area reserved in the management data save area 191 of the SSD 19. If the data to update exists in the SSD 19, the HDD/SSD driver 120 invalidates this data. If the Ownership flag has not the value "BIOS," HDD/SSD driver 120 determines that the data consistency cannot be guaranteed. In this case, the HDD/SSD driver 120 initializes the management data and makes the SSD 19 volatile (invalid).

Then, the HDD/SSD driver 120 rewrites the Ownership flag to the value "None" when the management data is stored after the completion of the flush operation during the above-mentioned nonvolatile operation.

The nonvolatile operation can thus be performed even if the other module writes data into the HDD 18, only by adding a minimal function to the other module capable of accessing the HDD 18 (e.g., BIOS 17) before the HDD/SSD driver 120 starts operating.

The data consistency cannot be guaranteed (i) if data in the HDD 18 is rewritten not via the HDD/SSD driver 120, for example, the data is rewritten by a program booted from the CD-ROM set in the ODD 20, (ii) if the HDD 18 or the SSD 19 are replaced by others, or (iii) if the HDD 18 or SSD 19 is removed from the information processing apparatus, data in the HDD 18 or SSD 19 is then updated in any other information processing apparatus and the HDD 18 or SSD 19 is incorporated back into the information processing apparatus. The HDD/SSD driver 120 has a function of determining, in such an event, that the data consistency cannot be guaranteed. This function that the HDD/SSD driver 120 has will be described below.

Assume that the HDD 18 and the SSD 19 used in the information processing apparatus has two functions. One function is to hold data pertaining to individuals (hereinafter referred to as "individual data") and provide the same in response to a request. The other function is to hold the data representing the number of times the power switch has been closed and provide this data in response to a request. It is also assumed that the number of times the power switch has been closed is updated when data is written not through the HDD/SSD driver 120. It is further assumed that the information processing apparatus can incorporate a plurality of HDDs 18.

To implement these functions, the HDD/SSD driver 120 reserves an area in the management data save area 191 of the SSD 19. In this area, the individual data is recorded, together with the number of times the power switch has been closed, as shown in FIG. 8.

The HDD/SSD driver 120 acquires the individual data and the number of times the power switch has been closed from the SSD 19 and the HDD 18, respectively, at the time of loading. Then, the HDD/SSD driver 120 compares the individual data about the SSD 19 and HDD 18, stored in the area reserved in the management data save area 191 of the SSD 19, with the number of times the power switch has been closed. The individual data acquired from the SSD 19 may differ from the individual data recorded in the management data save area 191, or the number of times the power switch has been closed, recorded in the management data save area 191, may not be smaller by one than the number now acquired from the SSD 19. In this case, the HDD/SSD driver 120 determines that the data consistency cannot be guaranteed, initializes the management data, and makes the SSD 19 volatile (invalid).

The individual data acquired from the HDD 18 may differ from the individual data recorded in the management data save area 191, or the number of times the power switch has been closed, recorded in the management data save area 191, may not be smaller by one than the number now acquired from the HDD 18. If this is the case, the HDD/SSD driver 120 determines that the data consistency cannot be guaranteed for the HDD 18, initializes the management data about the HDD 18, and invalidates the management data about the HDD 18, which is stored in the SSD 19.

The HDD/SSD driver 120 writes the number of times the SSD 19 and HDD 18 have been turned on, in the management data save area 191 of the SSD 19, when the management data is saved after the completion of the flush operation during the above-mentioned nonvolatile operation.

Thus, the data consistency can be determined not to be guaranteed in various cases where the data cannot be guaranteed as consistent with the data stored in the HDD 19.

(Cache Control by BIOS)

Not only the HDD/SSD driver 120, but also the BIOS 17 may utilize the data accumulated in the SSD 19. How the BIOS 17 utilizes the data will be explained.

When activated, the BIOS 17 checks the data consistency by using not only the Ownership flag, but also the individual data about the SSD 19 and HDD 18 and the number of times the SSD 19 and HDD 18 have been turned on (the power cycle counter). If the BIOS 17 determines that the data consistency can be guaranteed, it rewrites the Ownership flag to the value "BIOS." If the BIOS 17 determines that the data consistency cannot be guaranteed, it leaves the Ownership flag not rewritten.

In the process of reading data, when data consistency is guaranteed, the BIOS 17 reads the read data from the SSD 19 if the data exists, in its entirety, in the SSD 19. Otherwise, or if the data exists, in part, in the SSD 19 or if the data does not exist at all in SSD 19, the BIOS 17 reads data from the HDD 18. When data consistency is not guaranteed, the BIOS 17 reads the read data from the HDD 18 only.

In the process of writing data, the BIOS 17 writes data into the HDD 18 only. When the data consistency is guaranteed, the BIOS 18 invalidates data to update, if any, in the SSD 19.

If the BIOS 17 operates as described above, write commands for writing data need not be recorded, as shown in FIG. 7, in the write trace area reserved in the management data save area 191 of the SSD 19.

This additional simple function enables the BIOS 17 to utilize the data accumulated in the SSD 19, thereby to shorten the activation time. If the data to update exists in the SSD 19 at the time of writing data, the BIOS 17 may write the data into both the HDD 18 and the SSD 19. In general, the BIOS 17 cannot operate to write data into both the HDD 18 and the SSD 19 in parallel, so it is therefore disadvantageous in terms of ability. In view of this, the BIOS 17 may be a module able to write data into both the HDD 18 and the SSD 19 in parallel. In this case, data can be written into not only the HDD 18, but also the SSD 19.

If the BIOS 17 also utilizes the data accumulated in the SSD 19, it must refer to the existent-sector bit map in order to determine whether all data to read exists in the SSD 19. In view of the limited ability of the BIOS 17, it is too much for the BIOS 17 to refer to the existent-sector bit map. A technique that enables the BIOS 17 to determine whether all data to read exists in the SSD 19, without the necessity of referring to the existent-sector bit map, will be explained below.

When the HDD/SSD driver 120 stores the management data after the completion of the flush operation during the above-mentioned nonvolatile operation, the HDD/SSD driver 120 invalidates block of the SSD 19 for which the Partial flag is true, indicating that some sectors exist in the block. Any block (.e., Partial block) holding a part of effective data is thereby expelled from the SSD 19 after the shutdown. This makes it easier to determine whether all data to read exists in the SSD 19. Moreover, the existent-sector bit map need not be written since the Partial block has been expelled at the time of the shutdown.

If the Partial block is invalidated as described above when the management data is saved after the completion of the flush operation during the above-mentioned nonvolatile operation, the hit rate in reading data after the management data has been stored will decrease. A technique will be explained, which facilitates determining whether all read data exists in the SSD 19, without decreasing the hit rate after the management data has been stored.

After the completion of the flush operation during the above-mentioned nonvolatile operation, the HDD/SSD driver 120 saves the management data, regardless of the Partial flag. The BIOS 17 reads data from the SSD 19 if all the data exists in the SSD 19 and if the Partial flag is false (that is, all sectors exist in the block). When activated, the HDD/SSD driver 120 invalidates any block for which the Partial flag is true. This sequence also makes it unnecessary to write the existent-sector bit map at the time of saving the management data.

(High-Speed Boot)

The data used to achieve boot in any information processing apparatus is read, every time from the same area in most cases. The information processing apparatus according to this embodiment uses a technique of achieving boot at high speed. This technique will be described below.

Figure 9:
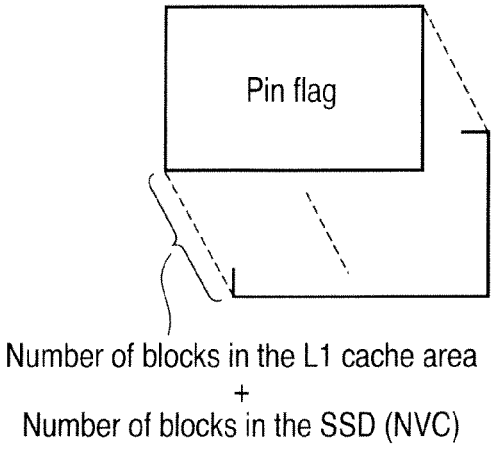
FIG. 9 is an exemplary diagram showing an exemplary pin flag provided in the information processing apparatus according to the embodiment.

To achieve the high-speed boot, the HDD/SSD driver 120 provides a Pin flag (shown in FIG. 9) for each block, in both the L1 cache area 201 of the main memory 13 and that part of the SSD 19, which is used as a cache for the HDD 18. The Pin flag indicates that the data has been used to achieve the boot.

The BIOS 17 sets the Pin flag associated with the block if the read data exists in the SSD 19. If the read data does not exist in the SSD 19, the BIOS 17 accumulates the identifier and block LBA of the HDD 19 in the trace area reserved in the management data save area 191 of the SSD 19.

In this case, software is provided as one of the various application programs 130, which operates when the OS 110 is activated. When this software starts operating, it transmits an activation completion notice to the HDD/SSD driver 120.

When the HDD/SSD driver 120 is activated or when it receives the activation completion notice, it reads data from the HDD 18 into the SSD 19 and sets the Pin flag associated with the block of the SSD 19, by referring to the trace the BIOS 17 has accumulated in the management data save area 191 of the SSD 19. If the data to read until the activation completion notice arrives exists in the L1 cache area 201 of the main memory 13 or in the SSD 19, the HDD/SSD driver 120 sets the Pin flag associated with the block. If the data to read does not exist in the SSD 19, the HDD/SSD driver 120 reads the data from the HDD 18 into the SSD 19 and then sets the Pin flag associated with the block of the SSD 19.

Thereafter, the HDD/SSD driver 120 utilizes the L1 cache area 201 of the main memory 13 or the SSD 19, writing data to the HDD 18 or reading data from the HDD 18, as requested by the host system. Thus, the HDD/SSD driver 120 exchanges data in the L1 cache area 201 of the main memory 13 or the SSD 19, so that the data accessed last may be accumulated before the data accessed previously. At this point, the HDD/SSD driver 120 performs a control not to invalidate the data in the SSD 19, for which the Pin flag is set (even if the data has been accessed a long time before).

That is, the hit rate in reading data stored in the SSD 19 at the time of the booting is increased, because the data used to achieve the boot is read from the same area in most cases. This helps to accomplish the boot at high speed.

When the HDD/SSD driver 120 saves the management data in the management data save area 191 of the SSD 19 at the time of the shutdown, it resets all Ping flags and then starts writing the management data. All Ping flags are reset at the time of the shutdown, because every time the boot is achieved, the learning of the read data must be performed for the next boot. As a result, the boot at high speed can be sufficiently accomplished even if the data area used to achieve the boot is changed to another.

A write (rewrite) request may be made to write the data for which the Pin flag is set. A method of coping with this case will be explained.

As described above, the data for which the Pin flag is set has a high possibility of being read at the next boot. However, this possibility is low, if a write request is made for the data. In this case, the BIOS 17 and the HDD/SSD driver 120 reset the Pin flag for the data.

This is because even the data used in the boot has a low possibility of being read at the next boot. In view of this, the Pin flag for such data is reset, invalidating the data as needed. The area for achieving the boot can therefore be used for other data. This increases the hit rate.

As described above, the data for which the Pin flag is set has a high possibility of being read at the next boot. This is why the HDD/SSD driver 120 performs a control so that the data accumulated in the SSD 19 may not be invalidated. The data therefore remains in the SSD 19, inevitably reducing the storage capacity of the SSD 19 that is used as a cache. The HDD/SSD driver 120 monitors the amount of data for which the Pin flag is set. If the amount of data exceeds a preset value, the HDD/SSD driver 120 stops setting the Pin flag, thereby excluding the subsequent data (used in the boot) as data to remain in the SSD 19. The storage capacity of the SSD 19 used as a cache therefore is limited, preventing a decrease in the cache hit rate.

(Option Process in Response to the Flush/Write FUA Request)

If a flush/write FUA request is strictly processed, the write-back operation will be greatly impaired in terms of performance. Therefore, the HDD/SSD driver 120 performs an "option flush process" function in response to the flush/write FUA request. The "option flush process" function can be "enabled" or "disabled." If the function is enabled, the HDD/SSD driver 120 will operate as described below.

In the write-through operation (WT mode or after the receipt of the shutdown notice in the WB mode), the HDD/SSD driver 120 strictly processes the flush/write FUA request, no matter whether the "option flush process" function is set to "Enable" or "Disable." If the "option flush process" function is set to "Enable," the HDD/SSD driver 120 strictly processes the flush/write FUA request. That is, in response to the flush FUA request, the HDD/SSD driver 120 writes all write data existing in the L1 cache area 201 of the main memory 13 and the SSD 19, which is not written yet, into the HDD 18. The HDD/SSD driver 120 then issues a Flush request to the HDD 18. When the process response to the issued flush request is finished, the HDD/SSD driver 120 notifies the host system of the completion of the process response to the flush FUA request. In response to the write FUA request, the HDD/SSD driver 120 operates as described above.

The "option flush process" function may be set to "Disable" during the write-back operation. If this is the case, the HDD/SSD driver 120 does nothing in response to the flush FUA request, and transmits a completion notice to the host system. In response to the write FUA request, the HDD/SSD driver 120 processes this request as an ordinary write request (that is, not as a write FUA request), and transmits a completion notice to the host system. In this case, the HDD/SSD driver 120 starts the flush operation at one or both of the following events. One event is the lapse of a prescribed time from the previous flush operation. The other event is that the number of the blocks (Dirty blocks), each containing data not written yet from the SSD 19 into the HDD 18, exceeds a predetermined value. The HDD/SSD driver 120 flushes all Dirty blocks when it starts the flush operation.

Having the "option flush process" function, which can be set to either "Enable" or "Disable," the HDD/SSD driver 120 can work well for both a user who wants to preserve the data at the expense of the performance, and a user who wants to maintain the performance at the expense of the data preservation. In addition, the operating time of the HDD 18 can be shortened, reducing the power consumption, because the data not written yet into the HDD 18 is flushed altogether.

(Data Merging Process)

As indicated above, the HDD/SSD driver 120 reserves the L1 cache area 201 in the main memory 13, between the user buffer 250, on the one hand, and the HDD 18 and SSD 19, on the other. Further, the HDD/SSD driver 120 manages the data stored in the L1 cache area 201, in units of blocks. The HDD/SSD driver 120 includes a function of merging the data in the L1 cache area 201 or SSD 19 with the data in the HDD 18 at high efficiency. This function will be explained below.

The data in the L1 cache area 201 or SSD 19 must be merged with the data in the HDD 18 if a part of the read data is stored in the L1 cache area 201 or if the read data is not stored in the L1 cache area 201 and is stored in part in the SSD 19. Generally, data is read from a plurality of areas reserved in the HDD 18, and a plurality of read requests must be issued to the HDD 18. Therefore, a plurality of read requests must be issued to the SSD 19, too, in order to merge the data in the SSD 19 with the data in the HDD 18. However, if a plurality of read requests are issued, the overhead will increase.

In order to prevent such an overhead increase, the HDD/SSD driver 120 first reserves a merge buffer 203 in the main memory 13. The merge buffer 203 has the same size as the block size. One or more merge buffers may be reserved in the main memory 13, each used under exclusive control. Alternatively, a plurality of merge buffers 203 may be reserved, each for one block in the L1 cache area 201.

To merge the data stored in the L1 cache area 201 with the data stored in the HDD 18, the HDD/SSD driver 120 reads data, in a minimal amount necessary, from the HDD 18 into a merge buffer 203. As shown in FIG. 10, the "minimal amount necessary" ranges from the head sector (lacking valid data) to the tail sector (lacking valid data), in one block stored in the L1 cache area 201. After reading this amount of data from the HDD 18 into a merge buffer 203, the HDD/SSD driver 120 copies the data lacking in the L1 cache area 201, from the merge buffer 203.

To merge the data stored in the SSD 19 with the data stored in the HDD 18, the HDD/SSD driver 120 reads data, in a minimal amount necessary, from the SSD 19 into the L1 cache area 201, and reads data, in a minimal amount necessary, from the HDD 18 into a merge buffer 203. After reading these amounts of data from the SSD 19 and the HDD 18, respectively, the HDD/SSD driver 120 copies the data lacking in the L1 cache area 201, from the merge buffer 203.

The merge buffers 203 can be utilized in the flush operation, too. During the flush operation, data is written into the HDD 18, exclusively from the L1 cache area 201. The valid data in the L1 cache area 201 may be dispersed and may ultimately be flushed. If this is the case, a plurality of write requests must be issued to the HDD 18, inevitably increasing the overhead. If the valid data in the L1 cache area 201 is dispersed, the HDD/SSD driver 120 reads data, in a minimal amount necessary, from the HDD 18 into a merge buffer 203. After reading this amount of data from the HOD 18 into the merge buffer 203 and merging this data into the L1 cache area 201, the HDD/SSD driver 120 finishes writing data into the HDD 18 by issuing one write request.

(Page Control)

The function the HDD/SSD driver 120 has to write data at high efficiency will be described below.

The SSD 19, which is a nonvolatile cache (NVC), can read and write data in units of sectors. In the SSD 19, however, the data is managed in units of pages in most cases. Data not mounting to one page is written in three steps. First, the present data is read in units of pages. Then, each page is merged with the data to write. Finally, the resulting data is written in units of pages. Inevitably, the data is written at a lower speed than in the case it is written in units of pages. Therefore, the HDD/SSD driver 120 performs a control of the data writing from the L1 cache area 201 into the SSD 19, so that the data written may have a size multiples of page size as measured from the page boundary. The data representing the page size of the SSD 19 can be acquired by two methods. In one method, the HDD/SSD driver 120 acquires the data from the SSD 19. In the other method, the data is given, as a set of data item (e.g., parameter), to the HDD/SSD driver 120.

In order to write the data having a size multiples of page size as measured from the page boundary, from the L1 cache area 201 into the SSD 19, the HDD/SSD driver 120 allocates the storage area of the SSD 19 in units of pages and sets the block size as a multiple of the page size.

(Set Associative)

Figure 11:
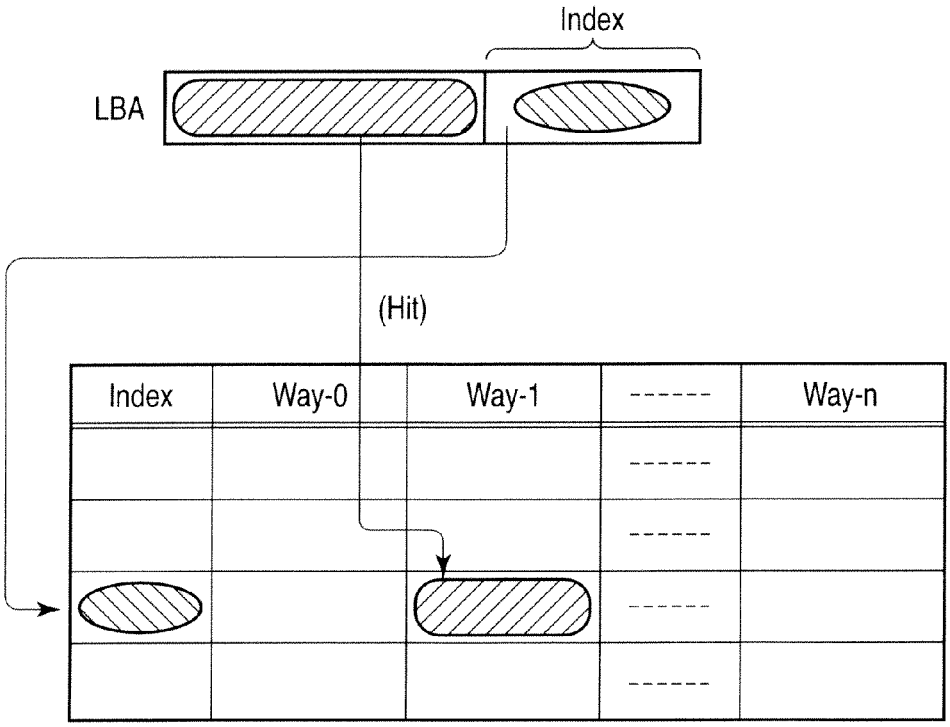
FIG. 11 is an exemplary conceptual diagram explaining how the information processing apparatus according to the embodiment manages data in the set associative mode.

In order to increase the cache retrieval speed, the HDD/SSD driver 120 can use a set associative method to manage the data stored in the L1 cache area 201 and SSD 19 (used as cache for the HDD 18). More specifically, the HDD/SSD driver 120 manages such a table as shown in FIG. 11, in the management data storage area 202 reserved in the main memory 13, for both the L1 cache area 201 and the SSD 19. Of the LBA indicating a block, some lower n bits are used as "Index" representing the number of entries in the table. The table is controlled so that data equivalent to the maximal number of Ways may be accumulated for any block that has "Index."

Using the set associative method, the HDD/SSD driver 120 may monitor, for each "Index," the number of data items for which Pin flags are set, thereby to prevent the number of such data items from exceeding a value prescribed for the "Index."

Moreover, using the set associative method, the HDD/SSD driver 120 may start the flush operation when the number of the Dirty blocks of any "Index" exceeds a predetermined value, if the "option flush process" function is set to "Disable."

As has been described, the SSD 19 is used as a cache for the HDD 18 in the information processing apparatus. In order to access the HDD 18 faster, the HDD/SSD driver 120 that controls the HDD 18 and the SSD 19 reserves the L1 cache area 201 in the main memory 13, between the user buffer 250, on the one hand, and the HDD 18 and SSD 19, on the other, and manages the data stored in the L1 cache area 201, in units of blocks. The speed and efficiency of the data transfer between the HDD 18 and the SSD 19 is thereby increased.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

[1. An information processing apparatus comprising:

a memory comprising a buffer area;

a first external storage separate from the memory;

a second external storage separate from the memory; and a driver configured to control the first and second external storages in units of predetermined blocks, wherein the driver comprises a cache reservation module configured to reserve a cache area in the memory, the cache area being logically between the buffer area and the first external storage and between the buffer area and the second external storage, and the cache reservation module is configured to manage the cache area in units of the predetermined blocks, using the cache area, secured on the memory by the cache reservation module, as a primary cache for the second external storage and a cache for the first external storage, and using part or the entire first external storage as a secondary cache for the second external storage, the buffer area being reserved in order to transfer data between the driver and a host system that requests for data writing and data reading;

a read controller configured to operate in response to a read request issued by the host system, and configured to:

store data in the cache area into the buffer area if whole data to be read exists in the cache area, read a first part of data not existing in the cache area from the second external storage into the cache area, store the read first part of data and a second part of data existing in the cache area into the buffer area, and accumulate the stored data in the first external storage, if a part of the data to be read exists in the cache area, read data in the first external storage and store the read data into the buffer area if data to be read does not exist in the cache area and whole data to be read exists in the first external storage, read a first part of data in the first external storage and a second part of data in the second external storage into the cache area, store the read data into the buffer area, and accumulate the read data in the first external storage, if data to be read does not exist in the cache area and a part of data to be read exists in the first external storage, and read data in the second external storage into the cache area, store the read data in the buffer area and accumulate the read data in the first external storage, if data to be read does not exist in the cache area or the first external storage;

a write controller configured to operate in response to a write request issued by the host system, and configured to:

rewrite data in the cache area by data to be written and accumulate the rewritten data in the first external storage, if data to be updated exists in the cache area and does not exist in the first external storage, invalidate data in the first external storage, rewrite data in the cache area by data to be written and accumulate the rewritten data in the first external storage, if data to be updated exists in the cache area and the first external storage, rewrite data in the first external storage by data to be written if data to be updated does not exist in the cache area and exists in the first external storage, and store data to be written into the cache area and accumulate the stored data into the first external storage, if data to be updated does not exist in the cache area or the first external storage; and a flush controller configured to store data existing in the cache area and not written yet into the second external storage, into the second external storage, and to store data existing in the first external storage and not written yet into the second external storage, into the second external storage through the cache area.]

[2. The apparatus of claim 1, wherein the write controller is configured to execute storing data into the cache area or rewriting data in the cache area or the first external storage in accordance with conditions, and to issue a write force-unit access (FUA) request to the second external storage, on receiving from the host system the write FUA request.]

[3. The apparatus of claim 1, wherein the read controller is configured to store data in the first external storage into the buffer area through the cache area if data to be read does not exist in the cache area and whole data to be read exists in the first external storage.]

[4. The apparatus of claim 3, wherein the read controller is configured to store data in the first external storage into the buffer area in two modes, not through the cache area in one mode, and through the cache area in order to accumulate the data in the cache area in the other mode, if data to be read does not exist in the cache area and whole data to be read exists in the first external storage.]

[5. The apparatus of claim 1, wherein the write controller is configured to operate in a write-through mode, and is configured to:

rewrite data in the cache area and data in the second external storage by data to be written and accumulate the rewritten data in the first external storage if data to be updated exists in the cache area and does not exist in the first external storage;

rewrite data in the cache area, data in the first external storage and data in the second external storage by data to be written, if data to be updated exists in the cache area and the first external storage;

rewrite data in the first external storage and data in the second external storage by data to be written, if data to be updated does not exist in the cache area and exists in the first external storage; and rewrite data in the second external storage by data to be written if data to be updated does not exist in the cache area or the first external storage.]

[6. The apparatus of claim 5, wherein the write controller is configured to be able to operate another operating mode in the write-through mode, in the other operating mode, the write controller is configured to invalidate data in the first external storage, instead of rewriting the data in the first external storage, if data to be updated exists in the first external storage.]

[7. The apparatus of claim 1, wherein the driver further comprises an intra-block data managing module configured to provide a first sector bit map and a second sector bit map for each block of the cache area and the first external storage, and to manage the first sector bit map and the second sector bit map as management data in a management data storage area in the memory, the first sector bit map indicating whether the data in each block is valid or invalid in units of sectors, and the second sector bit map indicating whether any data in the block is not written yet into the second external storage in units of sectors.]

[8. The apparatus of claim 1, wherein the driver further comprises an intra-block data managing module configured to provide a sector bit map, a first flag and a second flag for each block of the cache area and the first external storage, and to manage the bit map, the first flag and the second flag as management data in a management data storage area in the memory, the sector bit map indicating whether the data in each block is valid or invalid in units of sectors, the first flag indicating whether data not written yet into the second external storage exists in the block, and the second flag indicating whether data exists in the whole or part of the block.]

[9. The apparatus of claim 7, wherein the driver further comprises a data guaranteeing module configured to:

cause the flush controller to store, into the second external storage, data existing in the cache area and not written yet into the second external storage and data existing in the first external storage and not written yet into the second external storage, at the time of receiving a shutdown notice from the host system;

cause the intra-block data managing module to store the management data in the management data storage area into a management data save area in the first external storage, after the flush controller finished operating; and cause the intra-block data managing module to store the management data in the management data save area into the management data storage area, and to initialize the management data about the cache area, at the time of activation.]

[10. The apparatus of claim 9, wherein the data guaranteeing module is configured to:

provide a third flag in the management data save area, the third flag indicating whether data accumulated in the first external storage is consistent with data stored in the second external storage, and the third flag comprising a first value when the driver is operating and a second value when the driver is not operating;

update the value of the third flag by the second value when the intra-block data managing module stores the management data in the management data storage area into the management data save area in the first external storage;

cause the intra-block data managing module to store the management data in the management data save area into the management data storage area and update the value of the third flag by the first value, if the third flag comprises the second value when the driver is activated; and initialize the management data in the management data save area to discard data in the first external storage and update the value of the third flag by the first value, if the third flag comprises the first value when the driver is activated.]

[11. The apparatus of claim 9, further comprising an activating module configured to write data into the second external storage and read data from the second external storage before the driver starts operating, wherein:

the data guaranteeing module is configured to provide a third flag in the management data save area, the third flag indicating whether data accumulated in the first external storage is consistent with data stored in the second external storage and the third flag comprising a first value when the driver is operating, a second value when the activating module is operating and a third value when neither the driver nor the activating module is operating;

the activating module is configured to update the value of the third flag by the second value, and to accumulate a write request issued to the second external storage, as trace data, in the management data save area, if the third flag comprises the third value at the time of activation; and the data guaranteeing module is further configured to:

update the value of the third flag by the third value, when the intra-block data managing module stores the management data in the management data storage area into the management data save area in the first external storage;

cause the intra-block data managing module to store the management data in the management data save area into the management data storage area, invalidate the updated data by the activating module, which exists in the first external storage, by referring to the trace data, and update the value of the third flag by the first value, if the third flag comprises the second value when the driver is activated; and initialize the management data in the management data save area to discard data in the first external storage, and update the value of the third flag by the first value, if the third flag comprises a value other than the second value when the driver is activated.]

[12. The apparatus of claim 11, wherein the activating module is configured to terminate accumulating the trace data and to update the value of the third flag by the third value, if the amount of the trace data exceeds a predetermined amount.]

[13. The apparatus of claim 9, wherein the data guaranteeing module is configured to:

manage individual data and the power cycle counter about the second external storage in the management data save area;

acquire the individual data and the power cycle counter from the second external storage at the time of activating the driver; and initialize the management data about the second external storage in the management data save area to discard data about the second external storage stored in the first external storage, if the individual data acquired from the second external storage differs from the individual data managed in the management data save area or if the value obtained by subtracting one from the power cycle counter acquired from the second external storage differs from the power cycle counter managed in the management data save area.]

[14. The apparatus of claim 13, further comprising an activating module configured to write data into the second external storage and read data from the second external storage before the driver starts operating, wherein the activating module is configured to:

acquire the individual data and the power cycle counter from the second external storage at the time of activation;

read data from the first external storage if data to be read exists in the first external storage when the individual data acquired from the second external storage is identical to the individual data managed in the management data save area and the value obtained by subtracting one from the power cycle counter acquired from the second external storage is identical to the power cycle counter managed in the management data save area; and invalidate data in the first external storage, if data to be updated due to writing data into the second external storage exists in the first external storage, when the individual data acquired from the second external storage is identical to the individual data managed in the management data save area and the value obtained by subtracting one from the power cycle counter acquired from the second external storage is identical to the power cycle counter managed in the management data save area.]

[15. The apparatus of claim 14, wherein the data guaranteeing module is configured to invalidate the data of a block in the first external storage, if the second flag associated with the block indicates that a part of data exists when the data guaranteeing module makes the intra-block data managing module store the management data in the management data storage area into the management data save area.]

[16. The apparatus of claim 14, wherein:

the activating module is configured to read data from the first external storage only if the second flag associated with the data indicates that whole data exists in the first external storage when data to be read exists in the first external storage; and the data guaranteeing module is configured to invalidate data of a block in the first external storage, if the second flag associated with the block indicates that a part of the data exists when the driver is activated.]

[17. The apparatus of claim 14, wherein:

the driver further comprises a boot data managing module configured to provide a fourth flag in the management data save area for each block of the cache area and the first external storage, the fourth flag indicating whether data is requested to be read when the host system is activating;

the activating module is configured to:

set the fourth flag associated with data in the first external storage to indicate that the data is requested to be read when the host system is activating, if data to be read exists in the first external storage; and accumulate a read request issued to the second external storage, as trace data, in the management data save area, if data to be read does not exist in the first external storage;

the read controller is configured to:

read data from the second external storage, which was read by the activating module, by referring to the trace data, accumulate the read data in the first external storage and set the fourth flag associated with the data in the first external storage to indicate that the data is requested to be read when the host system is activating, when the driver is activated or when an activation completion notice is received from the host system;

set the fourth flag associated with the data in the first external storage to indicate that the data is requested to be read when the host system is activating, if data to be read exists in the cache area or the first external storage when the host system issues a read request until the activation completion notice is received from the host system; and accumulate data read from the second external storage in the first external storage and set the fourth flag associated with the data in the first external storage to indicate that the data is requested to be read when the host system is activating, if data to be read does not exist in the first external storage when the host system issues a read request until the activation completion notice is received from the host system;

the read controller and the write controller are configured to maintain data in the first external storage so that data, for which the fourth flag indicates that the data is requested to be read when the host system is activating, remains in the first external storage; and the boot data managing module is configured to reset the fourth flag to indicate that the data is not requested to be read when the host system is activating, upon receiving a shutdown notice from the host system.]

[18. The apparatus of claim 17, wherein the activating module and the write controller are configured to reset the fourth flag associated with data to be updated in the first external storage to indicate that the data is not requested to be read when the host system is activating, if data to be updated exists in the first external storage.]

[19. The apparatus of claim 17, wherein the read controller is configured to terminate setting the fourth flag to indicate that the data is requested to be read when the host system is activating, before receiving the activation completion notice, if the amount of data for which the fourth flag is set to indicate that the data is requested to be read when the host system is activating, reaches a predetermined amount.]

[20. The apparatus of claim 1, wherein the flush controller is configured to operate a first mode and a second mode, in the first mode, the flush controller is configured to issue, on receiving from the host system a flush request for writing cached data, a write request to the second external storage so that data not written yet into the second external storage in the cache area and the first external storage is written into the second external storage, and to issue, after issuing the write request, a flush request to the second external storage so that cached data in the second external storage is written into the second external storage; and in the second mode, the flush controller is configured to do nothing on receiving from the host system a flush request, to issue a write request to the second external storage so that data not written yet into the second external storage in the cache area and the first external storage is written into the second external storage, when a predetermined time elapses from a previous flush operation or when the amount of data to be written, in the first external storage, increases to a predetermined amount.]

[21. The apparatus of claim 2, wherein the write controller comprises another operating mode, in the other operating mode, the write controller is configured to store data into the cache area or rewrite data in the cache area or the first external storage and to notify the host system of the write completion, without issuing a write FUA request to the second external storage, on receiving from the host system the write FUA request.]

[22. The apparatus of claim 1, wherein the read controller comprises:

a first module configured to reserve a merge buffer area in the memory, in which a first part of data to be read in the cache area or the first external storage is combined with a second part of data to be read in the second external storage; and a second module configured to read data in a minimal amount necessary for combining data to be read, from the second external storage into the merge buffer area, and to transfer data lacking in the cache area or the first external storage, from the merge buffer area into the cache area.]

[23. The apparatus of claim 22, wherein the flush controller is configured to combine data in the second external storage with data not written yet into the second external storage, dispersed in the cache area, using the merge buffer area, and to store the combined data into the second external storage, when data not written yet into the second external storage is dispersed in the cache area.]

[24. The apparatus of claim 1, wherein the driver further comprises a setting module configured to acquire a page size of the first external storage, and to allocate blocks to the first external storage with reference to page boundaries in the first external storage, data length of the blocks being set a multiple of the page size.]

[25. The apparatus of claim 1, wherein data exchange of the cache area and the first external storage is controlled by a set associative method.]

[26. A driver stored in a non-transitory computer readable medium which operates in an information processing apparatus comprising a memory comprising a buffer area which is reserved in order to transfer data between the driver and a host system that requests for data writing and data reading, a first external storage and a second external storage, the driver being configured to control the first and second external storages in units of predetermined blocks, the driver comprising:

a cache reservation module configured to reserve a cache area in the memory, the cache area being logically between the buffer area and the first external storage and between the buffer area and the second external storage, the driver being configured to manage the cache area in units of the predetermined blocks using the cache area, secured on the memory by the cache reservation module, as a primary cache for the second external storage and as a cache for the first external storage, and using part or the entire first external storage as a secondary cache for the second external storage;

a read controller configured to operate in response to a read request issued by the host system, and configured to:

store data in the cache area into the buffer area if whole data to be read exists in the cache area;

read a first part of data not existing in the cache area from the second external storage into the cache area, store the read first part of data and a second part of data existing in the cache area into the buffer area, and accumulate the stored data in the first external storage, if a part of data to be read exists in the cache area;

read data in the first external storage and store the read data into the buffer area if data to be read does not exist in the cache area and whole data to be read exists in the first external storage;

read a first part of data in the first external storage and a second part of data in the second external storage into the cache area, store the read data into the buffer area, and accumulate the read data in the first external storage, if data to be read does not exist in the cache area and a part of data to be read exists in the first external storage; and read data in the second external storage into the cache area, store the read data in the buffer area and accumulate the read data in the first external storage, if data to be read does not exist in the cache area or the first external storage;

a write controller configured to operate in response to a write request issued by the host system, and configured to:

rewrite data in the cache area by data to be written and accumulate the rewritten data in the first external storage, if data to be updated exists in the cache area and does not exist in the first external storage;

invalidate data in the first external storage, rewrite data in the cache area by data to be written and accumulate the rewritten data in the first external storage, if data to be updated exists in the cache area and the first external storage;

rewrite data in the first external storage by data to be written if data to be updated does not exist in the cache area and exists in the first external storage; and store data to be written into the cache area and accumulate the stored data into the first external storage, if data to be updated does not exist in the cache area or the first external storage; and a flush controller configured to store data existing in the cache area and not written yet into the second external storage, into the second external storage, and to store data existing in the first external storage and not written yet into the second external storage, into the second external storage through the cache area.]

*27. An information processing apparatus comprising a circuitry that interfaces with a first storage, a second storage, and a volatile memory device that stores a set of instructions, the volatile memory device including a buffer area and a cache area, the circuitry being configured to execute the set of instructions to:*

*in response to a first read request for acquiring first data:*

*acquire the first data from the second storage,*

*store the first data in the volatile memory device, and*

*store the first data in the first storage;*

*in response to a second read request for acquiring the first data:*

*determine whether the first data is stored in the volatile memory device;*

*if the first data is not stored in the volatile memory device:*

*acquire the first data from the first storage, and*

*store the first data in the volatile memory device.*

*28. The information processing apparatus of claim 27, wherein the circuitry is configured to execute the set of instructions to:*

*receive the first read request; and*

*receive the second read request.*

*29. The information processing apparatus of claim 28, wherein the first read request is received before the second read request.*

*30. The information processing apparatus of claim 28, wherein the first and second read requests are received consecutively.*

*31. The information processing apparatus of claim 27, wherein the storing of the first data in the volatile memory device constitutes a completed response to the first read request.*

*32. The information processing apparatus of claim 27, wherein the first and second storages use different storage mediums.*

*33. The information processing apparatus of claim 27, wherein the second storage includes a magnetic storage device, and wherein the first storage includes a solid state storage device.*

*34. The information processing apparatus of claim 27, wherein the circuitry is further configured to execute the set of instructions to:*

*determine whether the first data is stored in the volatile memory device or not; and*

*acquire the first data from the first storage after determining that the first data is not stored in the volatile memory device.*

*35. The information processing apparatus of claim 34, wherein the circuitry is further configured to execute the set of instructions to:*

*determine whether the first data is stored in the first storage or not; and*

*acquire the first data from the second storage after determining that the first data is not stored in the volatile memory device or the first storage.*

*36. An information processing apparatus comprising a circuitry that interfaces with a first storage, a second storage, and a volatile memory device that stores a set of instructions, the volatile memory device including a buffer area and a cache area, the circuitry being configured to execute the set of instructions to:*

*in response to a first read request for acquiring first data:*

*acquire the first data from the second storage,*

*store the first data in the volatile memory device, and*

*store the first data in the first storage;*

*in response to a second read request for acquiring the first data:*

*determine whether the first data is stored in the volatile memory device;*

*if the first data is not stored in the volatile memory device:*

*acquire the first data from the first storage, and*

*store the first data in the volatile memory device; and*

*in response to a first write request:*

*rewrite data in the cache area by data to be written and accumulate the rewritten data in the first storage, if data to be updated exists in the cache area and does not exist in the first storage,*

*invalidate data in the first storage, rewrite data in the cache area by data to be written and accumulate the rewritten data in the first storage, if data to be updated exists in the cache area and the first storage,*

*rewrite data in the first storage by data to be written if data to be updated does not exist in the cache area and exists in the first storage, and*

*store data to be written into the cache area and accumulate the stored data into the first storage, if data to be updated does not exist in the cache area or the first storage; and*

*store data existing in the cache area and not written yet into the second storage, into the second storage, and store data existing in the first storage and not written yet into the second storage, into the second storage through the cache area.*

*37. The information processing apparatus of claim 36, wherein the circuitry is configured to execute the set of instructions to:*

*receive the first read request; and*

*receive the second read request.*

*38. The information processing apparatus of claim 37, wherein the first read request is received before the second read request.*

*39. The information processing apparatus of claim 37, wherein the first and second read requests are received consecutively.*

*40. The information processing apparatus of claim 36, wherein the storing of the first data in the volatile memory device constitutes a completed response to the first read request.*

*41. The information processing apparatus of claim 36, wherein the first and second storages use different storage mediums.*

*42. The information processing apparatus of claim 36, wherein the second storage includes a magnetic storage device, and wherein the first storage includes a solid state storage device.*

*43. The information processing apparatus of claim 36, wherein the circuitry is further configured to execute the set of instructions to:*

*determine whether the first data is stored in the volatile memory device or not; and*

*acquire the first data from the first storage after determining that the first data is not stored in the volatile memory device.*

*44. The information processing apparatus of claim 36, wherein the circuitry is further configured to execute the set of instructions to:*

*determine whether the first data is stored in the first storage or not; and*

*acquire the first data from the second storage after determining that the first data is not stored in the volatile memory device or the first storage.*

* * * * *